(12) United States Patent
Spahlinger et al.

(10) Patent No.: US 12,169,136 B2
(45) Date of Patent: Dec. 17, 2024

(54) METHOD FOR OPERATING A MAGNETO-INDUCTIVE FLOWMETER, AND MAGNETO-INDUCTIVE FLOWMETER

(71) Applicant: Endress+Hauser Flowtec AG, Reinach (CH)

(72) Inventors: Andre Spahlinger, Bad Bellingen (DE); André Schaubhut, Schopfheim (DE); Heinz Rufer, Dornach (CH); Thomas Küng, Münchenstein (CH)

(73) Assignee: Endress+Hauser Flowtec AG, Reinach (CH)

( * ) Notice: Subject to any disclaimer, the term of this patent is extended or adjusted under 35 U.S.C. 154(b) by 254 days.

(21) Appl. No.: 17/756,960

(22) PCT Filed: Nov. 20, 2020

(86) PCT No.: PCT/EP2020/082905
§ 371 (c)(1),
(2) Date: Jun. 6, 2022

(87) PCT Pub. No.: WO2021/110442
PCT Pub. Date: Jun. 10, 2021

(65) Prior Publication Data
US 2023/0015365 A1    Jan. 19, 2023

(30) Foreign Application Priority Data

Dec. 6, 2019  (DE) .......................... 102019133462.4

(51) Int. Cl.
*G01F 1/58*    (2006.01)

(52) U.S. Cl.
CPC ................ *G01F 1/588* (2013.01); *G01F 1/58* (2013.01)

(58) Field of Classification Search
CPC .................................. G01F 1/588; G01F 1/58
See application file for complete search history.

(56) References Cited

U.S. PATENT DOCUMENTS 4,408,497 A * 10/1983 Suzuki ..................... G01F 1/60
                                                          702/45
4,784,000 A    11/1988 Gaertner
(Continued)

FOREIGN PATENT DOCUMENTS

DE    102012105716 A1    1/2014
DE    102016122495 A1    5/2018
(Continued)

*Primary Examiner* — Peter J Macchiarolo
*Assistant Examiner* — John M Royston
(74) *Attorney, Agent, or Firm* — Kelly J. Smith; Endress+Hauser (USA) Holding, Inc.

(57) ABSTRACT

The present disclosure relates to a method for operating a magneto-inductive flowmeter, wherein the magneto-inductive flowmeter has a measuring tube for conducting a flowable medium, at least two measurement electrodes for detecting a flow speed-based measurement voltage induced in the medium, and a magnetic field-generating device for generating a magnetic field which passes through the measuring tube, said magnetic field generating device having a coil. The method has the steps of applying a control voltage to the coil in order to generate a change in the coil current over time, and determining the change in the coil current over time in a change-over region, wherein the coil current is changed in the change-over region until a target coil current target is reached.

9 Claims, 2 Drawing Sheets

(56) References Cited

U.S. PATENT DOCUMENTS

| | | |
|---|---|---|
| 2006/0081067 A1 | 4/2006 | Budmiger |
| 2007/0220947 A1* | 9/2007 | Keese ........................ G01F 1/58 |
| | | 73/1.16 |
| 2014/0083200 A1 | 3/2014 | Rogers et al. |
| 2015/0177035 A1 | 6/2015 | Rovner et al. |
| 2019/0277679 A1* | 9/2019 | Tschambser ............ G01F 1/588 |
| 2021/0072056 A1* | 3/2021 | Ameri ........................ G01F 1/60 |

FOREIGN PATENT DOCUMENTS

| | | |
|---|---|---|
| EP | 2074385 A2 | 7/2009 |
| WO | 2014026841 A1 | 2/2014 |

* cited by examiner

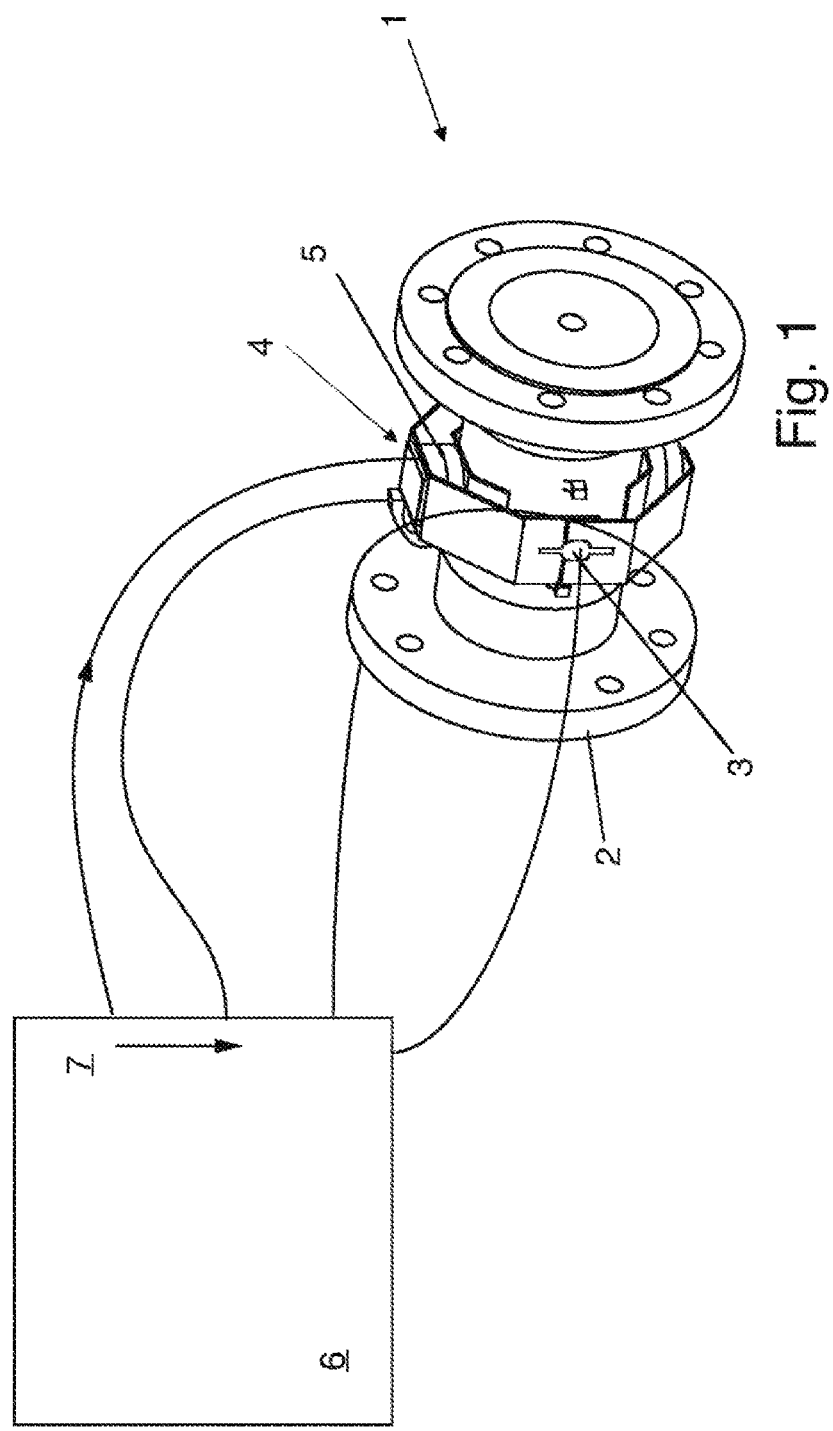

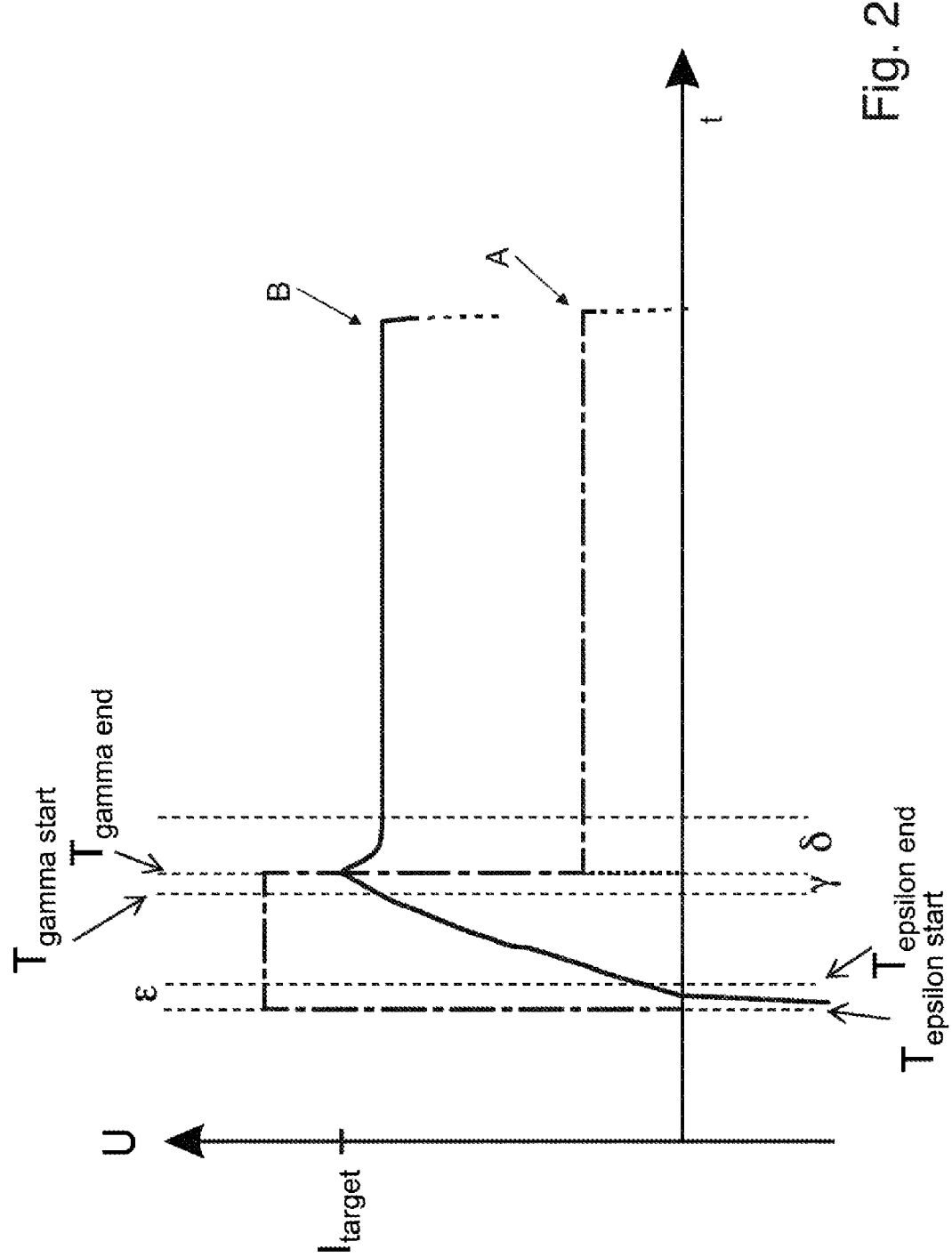

METHOD FOR OPERATING A MAGNETO-INDUCTIVE FLOWMETER, AND MAGNETO-INDUCTIVE FLOWMETER

CROSS-REFERENCE TO RELATED APPLICATIONS

The present application is related to and claims the priority benefit of German Patent Application No. 102019133462.4, filed on Dec. 6, 2019, and International Patent Application No. PCT/EP2020/082905, filed Nov. 20, 2020, the entire contents of which are incorporated herein by reference.

TECHNICAL FIELD

Magneto-inductive flowmeters are used for determining the flow rate and the volumetric flow of a flowing medium in a pipeline. A magneto-inductive flowmeter has a magnet system that generates a magnetic field perpendicular to the direction of flow of the flowing medium. Single coils are typically used for this purpose. In order to realize a predominantly homogeneous magnetic field, pole shoes are additionally formed and attached such that the magnetic field lines run over the entire pipe cross-section substantially perpendicularly to the transverse axis or in parallel to the vertical axis of the measuring tube. A measurement electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measurement voltage depends on the velocity of the flowing medium, the flow rate U and, with the aid of a known pipe cross-section, the volumetric flow u can be determined from the induced measurement voltage $\dot{V}$.

Magnetic-inducto flowmeters are frequently used in process and automation technology for fluids with an electrical conductivity upwards of approximately 5 µS/cm. Corresponding flowmeters are marketed by the applicant in a wide variety of designs for various fields of application, for example under the name PROMAG.

BACKGROUND

Conventional magneto-inductive flowmeters have a housing around the measuring system, which is configured to protect the measuring system against damage and external influences, such as external fields. In the absence of shielding, external magnetic fields influence the magnetic field generated in the interior of the measuring tube, which leads to measurement errors.

SUMMARY

The object of the invention is to provide a method for operating a magneto-inductive flowmeter with which influences due to external magnetic fields can be detected.

In addition, the object is to provide a magneto-inductive flowmeter that is designed to carry out the method.

Said object is achieved by the method for operating a magneto-inductive flowmeter and by the magneto-inductive flowmeter according to the present disclosure.

The method according to the invention for operating a magneto-inductive flowmeter, has a measuring tube for conducting a flowable medium, at least two measurement electrodes for detecting a flow-velocity-dependent measurement voltage induced in the medium and a magnetic-field generating device for generating a magnetic field passing through the measuring tube,
wherein the magnetic-field generating device has a coil; and comprises the method steps:
applying a control voltage to the coil in order to generate a change in the coil current over time; and
determining the change in the coil current over time in a change-over region,
wherein, in the change-over region, a change in the coil current is present until a target coil current $I_{target}$ is reached.

It is particularly advantageous if the presence of disturbing influences can be deduced via the monitoring of the change in the coil current over time. No additional sensors are thus necessary in or on the measuring tube, such as Hall sensors or Förster probes, which monitor the resulting magnetic field in the measuring tube.

Possible disturbing influences on the magnetic field resulting in the measuring tube are external magnetic fields of permanent magnets, fluctuations in the ambient temperature, ferromagnetic constituents in the conducted medium, damage to the magnetic-field generating device, production errors and/or external magnetic fields of, for example, electric motors or generators.

Conventional magneto-inductive flowmeters have coils that are operated with direct current with an alternating current direction. The period in which the coil current has reached its target value and in which the coil current is essentially constant is called the measuring range. The period between two successive measurement ranges is hereinafter referred to as the change-over region. Changing the sign of the applied coil voltage causes the coil current to vary in this period until it has reached a target coil current $I_{target}$.

The target coil current $I_{target}$ can be the coil current on which regulation is based and when said target coil current is reached a measurement is taken of the voltage induced in the flowing medium. In this context, such a target coil current is referred to as the coil measurement current. However, methods for regulating the coil current are also known, with which the coil current in the change-over region is regulated to a further target coil current, namely a peak coil current that is greater than the coil measurement current and causes the time that has to be waited to be reduced until the coil current has reached the coil measurement current after the change-over.

Advantageous developments of the invention are the subject-matter of the subclaims.

One development additionally provides that the change-over region comprises a γ time range (γ),
wherein the change in the coil current over time in the γ time range (γ) is determined,
wherein the γ time range (γ) is immediately followed by a δ time range (δ) in which the change in the coil current has an opposite sign to the change in the coil current the γ time range (γ).

The γ time range is characterized by a coil current flowing throughout the entire period. In other words, the zero crossing is not in the γ time range. In addition, it is advantageous if the coil current values in the γ range are greater than the coil current values in the measuring range or than the target value of the coil current. The γ time range thus comprises a part of the coil current curve that is characterized by the settling of the coil current. Advantageously, the coil current values of the γ time range are taken, which essentially lie on a straight line or deviate from the straight line by no more than 1%, in particular no more than 0.5% and preferably no more than 0.2%.

The δ time range follows immediately after the γ time range and is characterized by an opposite sign of the change in the coil current as compared to the sign of the change in the coil current in the γ time range. The δ time range comprises a part of the coil current curve, which is characterized by the coil current settling until a constant coil current or target value is reached. The δ time range ends essentially when the coil current deviates only 1% from the coil measurement current.

It is not possible to take the time range in which the eddy currents are minimal, since this only occurs when the coil current is constant, as a result of which self-inductance cannot be determined. Advantageously, the coil current or the change in the coil current in the γ time range is measured and used for determining the self-inductance, since the eddy currents in the time range are stable or constant and their influence on self-inductance is minimal. It is thus possible to distinguish between influences caused by eddy currents and influences caused by external sources of interference.

One development provides that eddy currents occurring in the γ time range are essentially constant over time.

One development additionally provides that the γ time range (γ) has a γ time range start ($T_{\gamma\ start}$), wherein, in the γ time range start ($T_{\gamma\ start}$), a value of the coil current is at least 75%, in particular at least 85% and preferably 95% of a value of the target coil current $I_{target}$.

It is particularly advantageous if the change in the coil current for the determination of the self-inductance of the coil is not determined until the coil current in the changeover region has reached at least 75%, in particular at least 85% and preferably 95% of a value of the target coil current $I_{target}$, wherein the target coil current can be the coil measurement current or the peak coil current. The γ time range end ($T_{\gamma\ end}$) is defined by the start of the δ time range.

One development provides that the change in the coil current is determined in an ε time range, wherein the coil current in the ε time range changes flow direction once.

To generate the magnetic field, a control voltage is applied to a coil arrangement comprising at least one coil. The resulting characteristic coil voltage curve has several time ranges. The ε time range describes the time period in which the coil current changes flow direction. It includes the zero crossing of the coil current at which no current is flowing through the coil and the time period immediately before and after.

It is particularly advantageous if the change in coil current in the ε time range is detected and thus too the state in which the coil current is essentially zero or at least minimal. The resistance and thus also temperature-dependent influences on the resistance of the coil winding can thus be minimized.

A further development provides that the ε time range (ε) has an ε time range start ($T_{\varepsilon\ start}$), wherein a value of the coil current at the ε time range start ($T_{\varepsilon\ start}$) is less than 15%, in particular less than 10% and preferably less than 5% of the value of the target coil current $I_{target}$.

A further development provides that the ε time range (ε) has an ε time range end ($T_{\varepsilon\ end}$), wherein a value of the coil current at the ε time range end ($T_{\varepsilon\ end}$) is less than 15%, in particular less than 10% and preferably less than 5% of the value of the target coil current $I_{target}$.

One development provides additionally the following method steps:

measuring a coil voltage applied to the coil; and determining a self-inductance of the coil by means of the change in the coil current over time and the coil voltage.

Inductance is a property of electrical circuits or components, in particular of coils. A distinction should be drawn between self-inductance (also called self-induction) and mutual inductance. The self-inductance L of a circuit relates the rate of change over time of the electric current I to the voltage U:

$$U = L \cdot dI/dt$$

The mutual induction (or inductive coupling) is the mutual magnetic influence of two or more spatially adjacent electrical circuits by electromagnetic induction as a result of a change in the magnetic flux.

Disturbing influences affect the self-inductance of the entire system of the magneto-inductive flowmeter. By monitoring self-inductance, disturbing influences can be detected and compensated without the need to attach additional sensors in or on the measuring tube. For this reason, the evaluation circuit is designed to determine the self-inductance from the coil current or from the change in the coil current and the coil voltage.

Advantageously, a measurement circuit is configured to determine the coil voltage and the coil current or the change in the coil current.

One development provides additionally the following method steps:

outputting the change in the coil current over time or a quantity dependent on the change in the coil current.

Advantageously, the change in the coil current or a quantity dependent on the change in the coil current and characteristic of the overall system is passed on to the user by means of an output unit. The user thus receives a further monitoring parameter, which offers advantages in particular in applications in which ferromagnetic constituents are conducted in the medium.

One development provides additionally the following method steps:

determining a correction term assigned to a determined deviation of the change in the coil current over time from a reference value, and calculating a corrected measurement voltage value $U_{corr}$ taking into account the correction term and a measured measurement voltage value $U_{meas}$ and/or a corrected quantity dependent on the measured measurement voltage value.

One development provides that the reference value is determined by means of a mathematical model, calibration method and/or simulation program, wherein the deviation of the change in the coil current from the reference value is in each case assigned a correction term.

For certain applications, a permanent diagnosis of the state of the magnetic field is not sufficient. It is precisely in the drinking water sector that it is prescribed that the flowmeter be insensitive to external disturbing influences, such as for example caused by permanent magnets.

It is therefore advantageous if the evaluation circuit is configured to correct the detected deviation of the change in the coil current from a reference value and the corresponding influence on or falsification of the determined flow measured value. The reference value is previously determined during the adjustment of the magneto-inductive flowmeter and stored in a memory unit of the evaluation circuit.

The magneto-inductive flowmeter according to the invention is characterized in that the flowmeter has an operating, measurement and/or evaluation circuit, which is configured to carry out the method according to any one of the preceding claims.

Measurement circuits in the field of flow measurement technology are sufficiently well-known. The object of the measurement circuit is to detect very small absolute values and changes in the respective measurement variable. There is a plurality of different developments, each having its advantages and disadvantages.

On the one hand, the measurement circuit may be configured to tap a potential at one of the measurement electrodes in relation to a reference potential. Thus, even if one of the two measurement electrodes fails, the flow rate can still be determined on the basis of a determined potential. The housing potential or a ground potential is suitable as the reference potential.

On the other hand, the measurement circuit may be designed to detect and record a potential difference prevailing between two measurement electrodes or two groups of measurement electrodes.

In addition, the measurement circuit can be configured to determine the coil voltage and the coil current or the change in the coil current at the coils.

A measurement circuit therefore comprises an analog/digital converter that converts into digital data the incoming signals, in this case the potential difference currently present at the respective pair of measurement electrodes, the electrical potential prevailing at the respective measurement electrode or the current flowing through the coil, which data are then further processed or stored by an evaluation circuit. However, other measuring converters or measuring transducers from the field of digital measurement technology are also known and suitable for detecting a measurement voltage or an electrical potential.

The evaluation circuit is configured to process the measurement values of the respective measurement variables measured by the measurement circuit and to determine the measurement variable being sought. An evaluation circuit therefore usually comprises microprocessors, amplifiers, and noise filters. The measurement and evaluation circuit can be of modular design and can communicate by means of a wireless connection, or can be part of a single electronic measurement and evaluation unit, which is arranged in a housing of the flowmeter.

A special development provides that a coil voltage time curve applied to the coils has change-over regions and measurement ranges,
wherein change-over regions and measurement ranges alternate,
wherein the control voltage of a measuring range and the control voltage of a change-over region in particular directly following the measuring range have opposite signs.

It is particularly advantageous if, for the determination of the flow measurement value, the induced measurement voltage of the change-over region is awaited and measurement takes place exclusively in the measuring range, since in that period the magnet system will have settled. The polarity reversal of the voltage source leads to a stable zero point and renders measurement insensitive to influences from multi-phase substances, inhomogeneities in the liquid or low conductivity.

A specific development provides that the change in the coil current is determined in the change-over region.

The coil current or the change in the coil current is preferably determined in the change-over region, since the coil current in the measuring range is constant or the change in the coil current is minimal.

A special development provides that the control voltage is constant in the change-over region,
wherein the control voltage assumes a first voltage value in the change-over region,
wherein the control voltage assumes a second voltage value in the measuring range,
wherein the first voltage value is greater than the second voltage value.

This characteristic coil voltage curve minimizes the time in which the coil current settles. As a result, the measuring range begins earlier and the operating frequency can be increased.

The invention is explained in greater detail with reference to the following figures. The following are shown:

BRIEF DESCRIPTION OF THE DRAWINGS

FIG. 1 shows a magneto-inductive flowmeter; and
FIG. 2 shows a diagram showing the variation over time of the coil current and of the coil voltage.

DETAILED DESCRIPTION

The structure and measuring principle of the magnetic-induction flowmeter 1 is known in principle (see FIG. 1). A medium having an electrical conductivity is conducted through a measuring tube 2. The measuring tube 2 usually comprises a metallic tube or a plastic tube. A magnetic-field generating device 4 is mounted in such a way that the magnetic field lines are oriented perpendicularly to a longitudinal direction defined by the measuring tube axis. A saddle coil or a pole shoe with a mounted coil 5 is preferably suitable as the magnetic-field-generating device 4. When the magnetic field is applied, a potential distribution is produced in the measuring tube 2, which is tapped by two measurement electrodes 3 mounted opposite each other on the inner wall of the measuring tube 2. In general, two measurement electrodes 3 are used, which measurement electrodes are arranged diametrically and form an electrode axis that runs perpendicular to an axis of symmetry of the magnetic field lines and of the longitudinal axis of the measuring tube 2. On the basis of the measured measurement voltage and taking into account the magnetic flux density, the flow rate of the medium can be determined and, taking into account the cross-sectional area of the tube, the volumetric flow rate can be determined. If the density of the medium is known, it will be possible to determine the mass flow rate. In order to prevent the measurement voltage applied to the first and second measurement electrodes 3 from being dissipated via the tube, the inner wall is lined with an insulating material or a plastic liner.

The magnetic field built up by means of the coil and pole-shoe arrangement is generated by a clocked direct current of alternating flow direction. An operating circuit 6 is connected to the two coils 5 and is configured to apply a control voltage with a characteristic curve to the coil arrangement, with which the coil current is regulated. A characteristic curve of the control voltage can be seen in FIG. 2.

The polarity reversal of the voltage source ensures a stable zero point and renders measurement insensitive to influences from multi-phase substances, inhomogeneities in the liquid or low conductivity. A measurement and/or evaluation circuit 7 reads the voltage applied to the measurement electrodes 3 and outputs the flow rate and/or the calculated volume flow rate and/or the mass flow rate of the medium. In the cross-section, shown in FIG. 1, of a magneto-inductive flowmeter 1 the measurement electrodes 3 are in direct contact with the medium. However, coupling can also take place capacitively. According to the invention, the measurement and/or evaluation circuit 7 is additionally configured to measure the coil voltage actually applied to the coils and the coil current or the change in the coil current over time. A display unit (not shown) outputs the determined change in the coil current over time or a quantity dependent on the change in the coil current. Alternatively, a message or a warning message can be output if these deviate from the stored reference value. The reference value is determined by means of a mathematical model, calibration method and/or simulation program. However, this is not sufficient in particular in applications in the drinking water sector. For this reason, the measurement and/or evaluation circuit 7 is configured to correct the determined deviation by means of a stored correction factor.

FIG. 2 shows a diagram that depicts the variation over time of the coil current B and of the coil voltage A.

The depicted curve of the coil voltage A is characterized by two constant voltage values, which are in each case applied to the coils for a certain period of time, wherein the two voltage values and the respectively assigned time periods differ. However, operating methods for magneto-inductive flowmeters are also known, in which only a constant voltage value with alternating polarity or a voltage curve is applied in which the voltage value is adjusted with respect to time. However, the advantageous time ranges in which the influences on the self-inductance of the coil are minimal also apply to other operating methods. The illustrated curve A shows a time interval that is repeated over time and the sign of which alternates. In the prior art, voltage curves are known, which, between the time periods in which a voltage is applied to the coils, have a rest phase in which no voltage is applied; rather, only the decay behavior of the voltage is determined.

The depicted curve of the coil current B has two regions. In a first region, the coil current changes due to a change in the applied coil voltage. This region is also referred to as the change-over region. In the second region, coil current and coil voltage are essentially constant. For this reason, before the measurement voltage is tapped at the measurement electrodes and the flow measurement value is determined, there is therefore usually a wait until the coil current has settled and is constant or has reached the target value. The second region is also referred to as the measuring range. In addition, the coil current curve has three further characteristic periods ($\varepsilon$, $\delta$ and $\gamma$).

The $\varepsilon$ time range covers the period in which the coil current changes flow direction. This is also referred to as the zero crossing. Precisely at the zero crossing, no coil current flows through the coil and the influence of the electrical resistance of the coil on the self-inductance of the coil is negligibly small. This is particularly advantageous, since influences due to the temperature-dependent conductivity of the coil winding material are thereby eliminated. The $\varepsilon$ time range has an $\varepsilon$ time range start ($T_{\varepsilon\ start}$) and an $\varepsilon$ time range end ($T_{\varepsilon\ end}$). The $\varepsilon$ time range begins when the value of the coil measurement current is less than 15%, in particular less than 10% and preferably less than 5% of the value of the target coil current $I_{target}$. The $\varepsilon$ time range ends when the value of the coil measurement current is greater than 15%, in particular greater than 10% and preferably greater than 5% of the value of the target coil current $I_{target}$, wherein $I_{target}$, according to the development depicted, is the peak coil current.

The $\gamma$ and $\delta$ time ranges lie immediately one after the other and essentially cover the time period in which the coil current overshoots or settles. The $\delta$ time range comprises the time period in which the sign of the change in the coil current is opposite to the sign in they time range. In addition, the change in coil current decreases in the $\delta$ time range until the coil current has reached the target value and the second region begins. The $\gamma$ time range comprises the time period immediately before the $\delta$ time range, wherein however a coil current flows throughout the entire time range. That is to say, the zero crossing of the coil current does not lie within the $\gamma$ time range.

The coil current values of the $\gamma$ time range are preferably characterized in that they are greater than the target value of the coil current in the second region or in the measuring range. Furthermore, the $\gamma$ time range is selected such that the coil current values lie on a straight line. It has been found that the eddy currents assume a stable state in the $\gamma$ time range and do not change or change only slightly. Their influence on the self-inductance of the coil is thus also minimal. As a result, even the smallest deviations of self-inductance from the reference value that arise as a result of external influences can already be detected and compensated. The $\gamma$ time range start ($T_{\gamma\ start}$) begins when the value of the coil measurement current is at least 75%, in particular at least 85% and preferably 95% of a value of the target coil current $I_{target}$, wherein, according to the depicted development, the target coil current $I_{target}$ corresponds to the peak coil current. The $\gamma$ time range end ($T_{\gamma\ end}$) is defined by the start of the $\delta$ time range, in particular by the time at which the coil current changes the flow direction. The measured values for determining self-induction preferably derive exclusively from the $\gamma$ time range.

The invention claimed is:

1. A method for operating a magneto-inductive flowmeter, wherein the magneto-inductive flowmeter has a measuring tube for conducting a flowable medium, at least two measurement electrodes for detecting a flow-velocity-dependent measurement voltage induced in the medium and a magnetic-field generating device for generating a magnetic field passing through the measuring tube, wherein the magnetic-field-generating device has a coil; comprising the method steps:

applying a control voltage to the coil in order to generate a change in the coil current over time; and determining the change in the coil current over time in a change-over region, wherein, in the change-over region, a change in the coil current is present until a target coil current I_target is reached;

wherein the change-over region comprises a $\gamma$ time range ($\gamma$), wherein the change in the coil current over time in the $\gamma$ time range ($\gamma$) is determined, wherein the $\gamma$ time range ($\gamma$) is immediately followed by a $\delta$ time range ($\delta$), in which the change in the coil current has an opposite sign to the change in the coil current in the γ time range (γ);
wherein the γ time range (γ) has a γ time range start (T_(γ start)),
wherein, in the γ time range start (T_(γ start)), a value of the coil current is at least 75% of a value of the target coil current I_target.

2. The method according to claim 1,
wherein eddy currents occurring in the γ time range (γ) are constant over time.

3. The method according to claim 1, comprising the method steps:
measuring a coil voltage applied to the coil; and
determining a self-inductance of the coil by means of the change in the coil current over time and the coil voltage.

4. The method according to claim 1, comprising the method step: outputting the change in the coil current over time or a quantity dependent on the change in the coil current.

5. The method according to claim 1, comprising the method steps:
determining a correction term assigned to a determined deviation of the change in the coil current over time from a reference value, and
calculating a corrected measurement voltage value U_corr taking into account the correction term and a measured measurement voltage value U_meas and/or a corrected quantity dependent on the measured measurement voltage value.

6. The method according to claim 1,
wherein a reference value is determined by means of a mathematical model, calibration method and/or simulation program,
wherein the deviation of the change in the coil current over time from the reference value is in each case assigned a correction term.

7. A method for operating a magneto-inductive flowmeter,
wherein the magneto-inductive flowmeter has a measuring tube for conducting a flowable medium, at least two measurement electrodes for detecting a flow-velocity-dependent measurement voltage induced in the medium and a magnetic-field generating device for generating a magnetic field passing through the measuring tube,
wherein the magnetic-field-generating device has a coil; comprising the method steps:
applying a control voltage to the coil in order to generate a change in the coil current over time; and
determining the change in the coil current over time in a change-over region,
wherein, in the change-over region, a change in the coil current is present until a target coil current I_target is reached;
wherein the change in the coil current over time in an ε time range (ε) is determined,
wherein the coil current in the ε time range (ε) changes flow direction once.

8. The method according to claim 7,
wherein the ε time range (ε) has an ε time range start (T_(ε start)),
wherein a value of the coil current at the ε time range start (T_(start)) is less than 15% of the value of the target coil current I_target.

9. The method according to claim 7,
wherein the ε time range (ε) has an ε time range end (T_(ε end)),
wherein a value of the coil current at the ε time range end (T_(ε end)) is less than 15% of the value of the target coil current I_target.

* * * * *